United States Patent
Lee

(10) Patent No.: US 11,579,599 B2
(45) Date of Patent: Feb. 14, 2023

(54) SYSTEM AND METHOD FOR MANAGING WELDING GUN

(71) Applicants: HYUNDAI MOTOR COMPANY, Seoul (KR); KIA MOTORS CORPORATION, Seoul (KR)

(72) Inventor: Daewon Lee, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 653 days.

(21) Appl. No.: 16/667,493

(22) Filed: Oct. 29, 2019

(65) Prior Publication Data

US 2020/0348660 A1 Nov. 5, 2020

(30) Foreign Application Priority Data

May 3, 2019 (KR) .................. 10-2019-0052278

(51) Int. Cl.
*G05B 23/02* (2006.01)
*B23K 11/30* (2006.01)
*B23K 11/25* (2006.01)
*B23K 9/095* (2006.01)
*B23K 11/31* (2006.01)
*G06K 9/62* (2022.01)

(52) U.S. Cl.
CPC .......... *G05B 23/024* (2013.01); *B23K 9/0953* (2013.01); *B23K 11/252* (2013.01); *B23K 11/3063* (2013.01); *B23K 11/3072* (2013.01); *B23K 11/314* (2013.01); *G06K 9/627* (2013.01)

(58) Field of Classification Search
CPC ............... B23K 9/0953; B23K 11/252; B23K 11/3063; B23K 11/3072; B23K 11/314; G05B 23/024
See application file for complete search history.

(56) References Cited

U.S. PATENT DOCUMENTS

| | | | |
|---|---|---|---|
| 8,901,449 B2 * | 12/2014 | Takayama | B23K 11/36 219/86.1 |
| 2002/0053555 A1 * | 5/2002 | Matsuyama | B23K 11/257 219/110 |
| 2016/0221111 A1 * | 8/2016 | Bartlett | B23K 11/25 |
| 2019/0210176 A1 * | 7/2019 | Yamamoto | G05B 19/4065 |

* cited by examiner

*Primary Examiner* — Brian W Jennison

(74) *Attorney, Agent, or Firm* — McDonnell Boehnen Hulbert & Berghoff LLP

(57) ABSTRACT

A system managing a polishing state of tips of a welding gun of each welding robot installed in a production line of a vehicle includes: a robot controller storing tip polishing data including the number of polishing of the tips and a polishing amount of the tips generated after each tip dressing of the welding gun; and a server collecting the tip polishing data from the robot controller to store the collected data according to robot identification information of the robot and learning the store data through artificial neural network to generate reference data determining the polishing state of the tips corresponding to the robot identification information. The robot controller sets artificial neural network of the robot based on the reference data and determines whether a polishing state of the tips according to the number of polishing and the polishing amount of the tips is normal.

20 Claims, 11 Drawing Sheets

| Number of polishing | Start position | Space between tips | Tip polishing amount |
|---|---|---|---|
| 3 | 0.00 | 0.16 | 0.07 |
| 4 | 0.00 | 0.22 | 0.06 |
| 5 | 0.00 | 0.27 | 0.05 |

FIG. 7

| Number of polishing | Start position | Space between tips | Tip polishing amount | Result |
|---|---|---|---|---|
| 3 | 0.00 | 0.20 | 0.10 | Excessive |
| 4 | 0.00 | 0.30 | 0.10 | Excessive |
| 5 | 0.00 | 0.40 | 0.10 | Excessive |
| 3 | 0.00 | 0.16 | 0.07 | Normal |
| 4 | 0.00 | 0.22 | 0.06 | Normal |
| 5 | 0.00 | 0.27 | 0.05 | Normal |
| 3 | 0.00 | 0.14 | 0.04 | Too little |
| 4 | 0.00 | 0.18 | 0.04 | Too little |
| 5 | 0.00 | 0.22 | 0.04 | Too little |

FIG. 9A

|   | 0 | 1 | 2 |
|---|---|---|---|
| 0 | −8.161935 | −1.1986916 | 3.4146888 |
| 1 | 0.7103113 | 0.12067261 | −0.29830766 |
| 2 | 3.3609238 | 0.7853499 | −2.021111 |
| 3 | −0.8089865 | 0.5308833 | 0.2264679... |

[Weight]

FIG. 9B

| 0 | 2.643177 |
|---|---|
| 1 | 1.3933121 |
| 2 | −2.1973736 |

[Bias]

under "US 11,579,599 B2"

SYSTEM AND METHOD FOR MANAGING WELDING GUN

CROSS-REFERENCE TO RELATED APPLICATION

The present application claims priority to and the benefit of Korean Patent Application No. 10-2019-0052278 filed on May 3, 2019, which is incorporated herein by reference in its entirety.

TECHNICAL FIELD

The present disclosure relates to a welding gun management system and method, and more particularly, to a system and a method for managing a welding gun capable of determining a polishing state of a tip of the welding gun mounted on a robot in real time based on data.

BACKGROUND

The statements in this section merely provide background information related to the present disclosure and may not constitute prior art.

Generally, several welding robots are used to automatically perform spot welding or resistance welding to join a plurality of members in a production line of a vehicle. In addition, the number of the welding robots in operation is increasing due to automation of the production line.

The spot welding welds a base material by applying a high voltage current to the base material while two electrode tips attached to both ends of a welding gun of the welding robot is pressing the base material and continuously performs welding operations for a plurality of welding points.

The welding tips come into direct contact with the base material. Contact surfaces of fore-ends of the tips are deformed when the welding operation is repeated. For example, the surface of the tip may be deformed by contamination due to a welding soot and pressure and high temperature during the welding operation. The high voltage current required for the welding operation is lowered due to the deformation of the tip. Lowering of the high voltage current causes poor welding.

Therefore, a tip dressing operation is performed to polish the fore-ends of the tips through a polishing apparatus after a certain number of welding operations to prevent a welding defect. If the tip is not properly polished, the welding defect will occur. Thus, it is necessary to determine a polishing state of the tip after the tip dressing operation.

A tip inspection apparatus using a non-contact sensor has been developed recently. The tip inspection apparatus irradiates an inspection beam on a polishing surface of the tip and inspects the polishing state of the tip based on a measurement value of reflected light quantity.

A conventional tip inspection apparatus requires a separate working time in which the polishing surface of the tip is moved to a position at which the light beam is irradiated and then is returned to a working position for the welding operation. Thus, in a case of the production line having high unit per hour (UPH), a process for the production line may be delayed or a polishing time for the tip may not be secured.

Further, because degree of freedom of the welding gun is limited, the polishing surface of the tip may not be moved to a position at which the light beam is irradiated so that it is difficult to inspect the polishing state of the tip.

In addition, as the number of tip inspection devices corresponding to the increased number of the welding robots is increased, a cost of installation and operation of the tip inspection devices may increase. Cost of consumable is increased by replacing the tip that has a long service life but performs a certain number of welding operations.

Also, since sensor data of the tip inspection devices corresponding to the welding robots are different from each other, management work amount for the tip inspection is increased. If uniform data for the tip inspection is used, reliability of the tip inspection will be impaired.

SUMMARY

The present disclosure provides a system and a method for managing a welding gun capable of measuring the number of polishing (e.g., grinding) and a polishing amount of tips of a welding gun of each of welding robots performed during a tip dressing operation for the welding gun to learn tip polishing data including the number of polishing and the polishing amount of the tips through an artificial intelligence neural network of a server and of determining a polishing state of the tip of each of the welding robots in real time based on the learning data of the server.

Some forms of the present disclosure may provide the system for managing a polishing state of tips of a welding gun of each of welding robots installed in a production line of a vehicle, including: a robot controller configured to store tip polishing data including the number of polishing of the tips and a polishing amount of the tips that are generated after each of tip dressing operations of the welding gun in a table; and a server configured to collect the tip polishing data from the robot controller to store the collected data according to robot identification information of the welding robot and to learn the store data through an artificial neural network to generate reference data determining the polishing state of the tips corresponding to the robot identification information. The robot controller may be configured to set an artificial neural network of the robot based on the reference data and to determine whether a polishing state of the tips according to the number of polishing and the polishing amount of the tips is normal.

The reference data may include artificial neural network setting parameter information that determines the polishing state of the tips according to a space between the tips corresponding to the number of polishing and an increase amount of the space between the tips as normal, excessive, or too little, and the space between the tips and the increase amount of the space may be determined based on a start position of replaced tips of the welding gun measured in a state where the tips are in contact with a measurement plate between the tips.

The welding gun may include: a gun arm installed on one surface of a bracket that is mounted on an end-effector of the welding robot; a fixed tip that is an electrode which is in contact with one side of a base material and that is fixedly mounted on a holder of the gun arm; a moving tip that is an electrode that is in contact with the other side of the base material and that is mounted on an adaptor formed on the other side of the gun arm so as to be movable in forward and backward directions; and a servo motor that is operated according to an applied control signal to move the moving tip in a forward direction or a backward direction and configured to measure a moving distance of the moving tip according to an amount of rotation of the motor.

The robot controller may include: a communication device configured to match the tip polishing data with the robot identification information to transmit the matched tip polishing data to the server and to receive the reference data;

a data collection device configured to collect the tip polishing data of the tips measured in the state where the tips are in contact with a measurement plate between the tips; an artificial intelligence device configured to calculate the tip polishing data collected from the data collection device using the artificial neural network to which the reference data is applied to determine whether the polishing amount of the tips is normal, too little, or excessive; a storage device configured to cumulatively store the tip polishing data collected from the data collection device in the table; and a control device configured to reduce a pressure and a time of polishing of the tips performed by the welding robot when it is determined that the polishing amount of the tips is excessive.

The data collection device may be configured to collect a start position of replaced tips of the welding gun measured when a moving tip of the tips is moved to an upper surface of the measurement plate by operation of a servo motor in a state where a fixed tip of the tips is fixed to a lower surface of the measurement plate after the tips are replaced and to store the collected position in the table.

The tip polishing data may include the start position that is positions of ends of the tips, the number of polishing of the replaced tips, a space between the tips due to polishing of the replaced tips measured at a current position of the tips, and an increase amount of the space between the tips due to polishing of the replaced tips.

The current position may be positions of a currently polished tips of the welding gun and has the space between the tips increased as much as the polishing amount of the tips in a state where the welding robot is set to the same attitude control as attitude control for the start position.

A polishing amount of the moving tip of the polishing amount of the tips may be a moving distance that the moving tip moves to the upper surface of the measurement plate, and a polishing amount of the fixed tip of the polishing amount of the tips may be a value obtained by subtracting the polishing amount of the moving tip from the polishing amount of the tips.

The control device may be configured to generate an emergency event to stop the welding robot and to transmit the emergency event to the server to alert an operator of the system of the emergency event when underestimation of the polishing amount of the tips is repeated over a predetermined number of times.

The control device may be configured to calculate a remaining length of a fixed tip of the tips and the moving tip of the tips according to each of the tip dressing operations to alert the server of replacement time of the tips when the remaining length is less than a valid reference value.

The server may include: a communicator configured to receive the tip polishing data periodically collected by the robot controller to transmit the reference data to the robot controller; a data manager configured to generate classification data including bad data for learning of artificial intelligence based the collected tip polishing data; an artificial intelligence learning device configured to calculate the classification data through the learning of the artificial intelligence to generate the reference data for determining the polishing state of the tips of each of the welding robots; a database configured to store the tip polishing data, the classification data, and the reference data corresponding to the robot identification information; a graphic generation device configured to display a result of determination of the polishing state of the tips of each of the welding robots based on data stored in the database through a graph so that an operator of the system checks the result; and a controller configured to transmit a weight and a bias of the reference data to each of the robot controllers corresponding to the robot identification information and to update a state of the artificial neural network.

The data manager may be configured to generate the bad data as many as the number of normal data corresponding to the tip polishing data using the bad data accumulated or setting information of the operator.

The artificial intelligence learning device may be configured to set the reference data as two layers using opensource software used for machine learning and to adjust parameter values set in the weight and the bias of each of the layers.

Some forms of the present disclosure may provide the method for managing a polishing state of tips of a welding gun of each of welding robots installed in a production line of a vehicle, wherein the method is performed by a robot controller that controls the welding robot and interlocks with a server managing the welding robot, including: a) setting, by the robot controller, an artificial neural network for determining the polishing state of the tips of the welding gun based on reference data received from the server; b) setting, by the robot controller, a space between replaced tips of the welding gun measured in a state where the replaced tips are in contact with a measurement plate between the tips as a start position; c) measuring, by the robot controller, tip polishing data including the number of polishing of the tips and a polishing amount of the tips that are generated after each of tip dressing operations of the welding gun in a state where the tips are in contact with the measurement plate, wherein the polishing amount of the tips is determined based on the start position; and d) computing, by the robot controller, the measured tip polishing data through the set artificial neural network to determine whether the polishing state of the tips is normal.

The method for managing the polishing state of tips of the welding gun may further include: before step a), matching, by the robot controller, polishing data regarding the tips accumulated in a table for a predetermined time period with robot identification information of the welding robot to transmit the matched tip polishing data to the server; and receiving, by the robot controller, the reference data derived by learning the polishing data regarding the tips though an artificial intelligence of the server.

Step c) may include: measuring, by the robot controller, the tip polishing data based on a moving distance of a moving tip of the tips.

Step d) may include: determining, by the robot controller, whether the polishing amount of the tips is normal, excessive, or too little.

Step d) may include: adjusting, by the robot controller, the excessive polishing amount within a normal range by reducing a pressure and a time of polishing of the tips performed by the welding robot when the robot controller determines that the polishing amount of the tips is excessive.

Step d) may include: adjusting, by the robot controller, a deficient polishing amount of the tips to a normal range through a re-polishing when the robot controller determines that the polishing amount of the tips is underestimated; and generating, by the robot controller, an emergency event to stop the production line and to transmit the emergency event to the server to alert an operator of the emergency event when underestimation of the polishing amount of the tips is repeated over a predetermined number of times.

Step d) may include: when the robot controller determines that the polishing amount of the tips exists in a normal range, recording, by the robot controller, the determination result in a table; calculating, by the robot controller, current positions of ends of the tips to calculate a remaining tip length of the tips in comparison with a new product; and alerting, by the robot controller, the server of replacement time of the tips when the remaining tip length is less than a valid reference value.

The system and the method for managing the welding gun in some forms of the present disclosure may collect the tip polishing data from the robot controller of the welding robot installed in the production line of the vehicle using the server to learn the tip polishing data through the artificial intelligence and may transplant or transfer the reference data for determining whether the polishing amount of the tip of each of the welding robots is normal (e.g., good) or bad to the neural network of the robot controller so that the normal state, the excessive state, and the too little state of the polishing amount of the tip may be determined. Thus, the tip polishing state of the welding gun mounted on each of the welding robots in real time without a sensor based on the learning data may be managed.

Some forms of the present disclosure may reduce the pressure (e.g., a welding force) and the polishing time of the welding robot and may alert the server of the replacement time of the tip according to the determination of the validity of the tip length measured in each robot controller when the polishing amount of the tip is overestimated. Accordingly, some forms of the present disclosure may deal with the production line stop caused by frequent tip replacement and consumable cost increase.

Further, some forms of the present disclosure may correct the polishing amount of the tip which is insufficient within the normal range through the re-polishing or may generate the event stopping the welding robot when the polishing amount of the tip is underestimated. Therefore, some forms of the present disclosure may prevent the welding quality from being deteriorated due to the tip polishing failure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 schematically shows a system for managing a welding gun installed in a production line of a vehicle in one form of the present disclosure.

FIG. 7 shows an example of classification data for determining whether the tip polishing data is normal or bad in one form of the present disclosure.

FIG. 9A and FIG. 9B show an example of reference data output through the artificial neural network learning in one form of the present disclosure.

Figure 1:
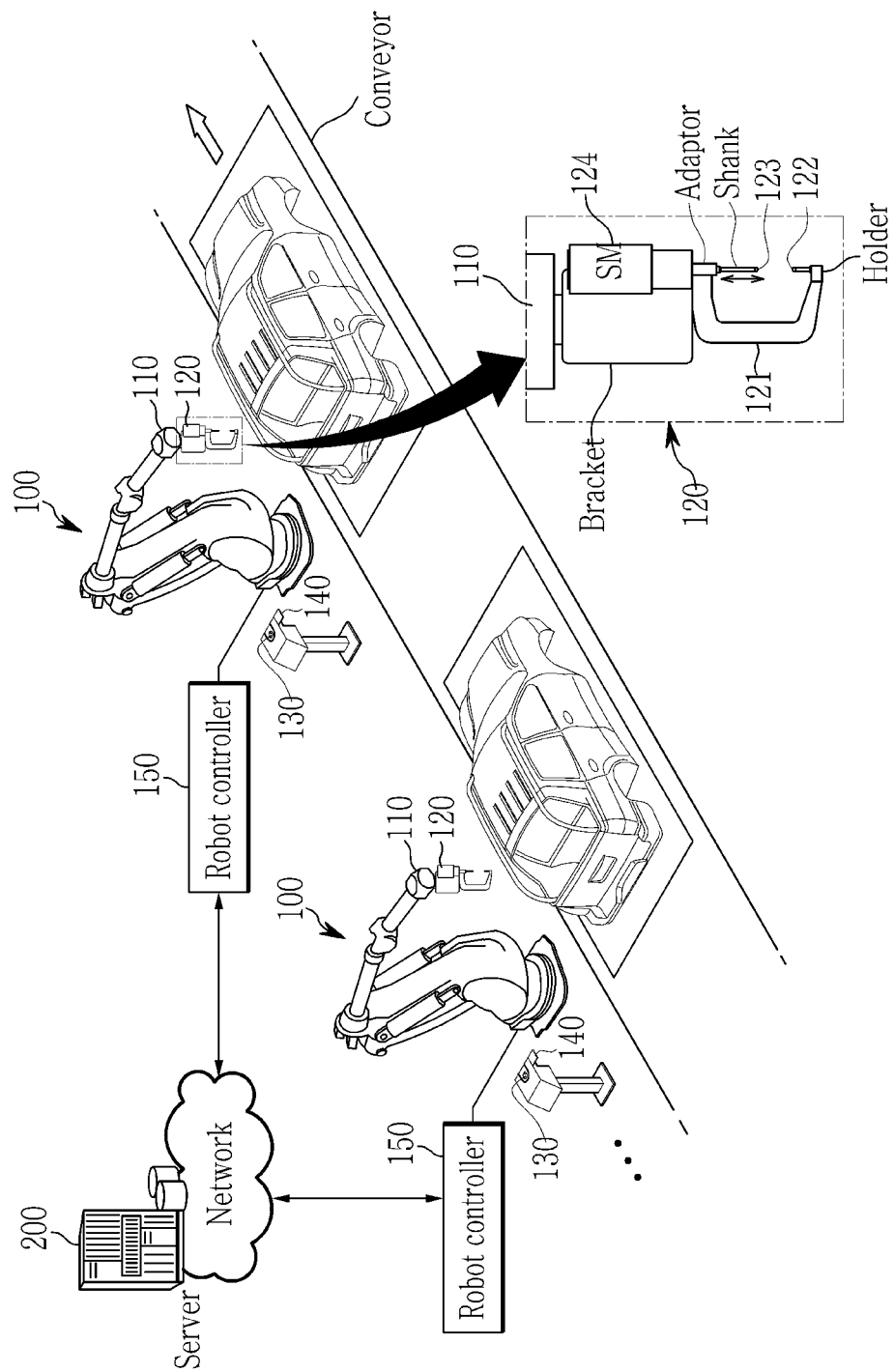

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Throughout the specification, terms such as "first", "second", "A", "B", etc. may be used to describe various elements, but the elements should not be limited by the terms. The terms are used only to distinguish one element from another. For example, a first element may be referred as a second element while not going beyond the scope of the rights of the present disclosure, and in a similar manner, the second element may be referred to as the first element.

A system and a method for managing a welding gun in some forms of the present disclosure will now be described in detail with reference to the drawings.

FIG. 1 schematically shows the system for managing the welding gun installed in a production line of a vehicle in some forms of the present disclosure.

Referring to FIG. 1, the system for managing the welding gun may include a plurality of welding robots 100 installed in the production line of the vehicle and a server 200 that manages a polishing state (e.g., a grinding state) of a tip or a welding tip of the welding gun 120 mounted on an end-effector 110 of each of the welding robots.

The welding robot 100 may be configured as a multi-joint manipulator of 4 to 6 degrees of freedom. The welding robot 100 may include a polisher or a grinder 130 for polishing or grinding electrode tips or welding tips of the welding gun 120, a measurement plate 140 for measuring polishing data, and a robot controller 150 controlling a welding operation through attitude control of the welding robot.

The welding robot 100 may perform the welding operation while moving the welding gun 120 to a welding position based on welding operation information having three-dimensional (3D) coordinate system information.

The welding gun 120 may include a gun arm 121, a fixed tip 122, a moving tip 123, and a servo motor 124.

The gun arm 121, which is a frame of which the tip is mounted on both sides, may be formed in C-shape and may be disposed on one surface of a bracket.

The fixed tip 122 may be an electrode which is in contact with one side of a base material, and may be fixedly mounted on a holder of the gun arm 121.

The moving tip 123 may be an electrode that is in contact with the other side of the base material and may be mounted on an adaptor formed on the other side of the gun arm 121 so as to be movable in forward and backward directions. The fixed tip 122 and the moving tip 123, which are consumables engaging with the base material for spot welding or resistance welding, may be mounted on ends of shanks formed in a longitudinal direction on both sides of the gun arm 121.

The servo motor 124 may be rotated according to an applied control signal to move the moving tip 123 in a forward direction or a backward direction. Rotational motion of the servo motor 124 may be converted into a linear motion that moves the moving tip 123 in the forward and backward directions through a mechanism.

The welding gun 120 may fix the fixed tip 122 on one side of the base material and may advance the moving tip 123 by driving the servo motor 124 to fix the moving tip on the other side of the base material so that the welding gun welds the base material by applying a high voltage current to the base material. The welding gun 120 may be referred to as a fixed gun or a servo gun.

The servo motor 124 may measure a moving distance of the moving tip 123 according to an amount of rotation of the motor.

For example, the servo motor 124 may advance the moving tip 123 according to the rotation amount of the motor to measure the moving distance generated when the moving tip is in contact with the base material. The moving distance of the moving tip 123 may be used to detect a polishing amount of the tip according to a dressing operation of the tip described later.

The moving distance may be used to detect a relative position or a relative coordinate of ends of both tips of the welding gun 120 mounted on the welding gun 120 based on coordinates (X, Y, Z) of the end-effector 110 according attitude control information of the welding robot 100.

In some forms of the present disclosure, the moving distance of the moving tip 123 may be measured by a distance measuring sensor that measures forward and backward length of the moving tip.

The polisher 130 may include a plurality of cutter blades rotated by a motor and may polish surfaces of the tips 122 and 123 which are pressed at a constant pressure.

In other words, when the tips 122 and 123 deformed are inserted in the polisher 130 and pressed through attitude control of the welding robot 100 in a rotating state of the cutter blades, the polisher 130 may perform the tip dressing operation for rounding the surfaces of ends of the tips.

The measurement plate 140 may be a plate of constant thickness to physically measure the polishing amount of the tips 122 and 123 after the tip dressing operation. The measurement plate 140 may include a rigid insulating material and may be fixed to one surface of the polisher 130 to minimize movement of the welding gun 120 in measuring the polishing amount of the tips.

The robot controller 150 may store attitude control information for the welding operation of the welding robot 100 and may control the welding operation of the welding gun 120 moved according to the attitude control of the welding robot 100. The attitude control may include not only a control for the welding operation but also controls for the tip dressing operation and measurement of the tip polishing amount.

The robot controller 150 may detect a relative coordinate of ends of both tips 122 and 123 of the welding gun 120 based on coordinates (X, Y, Z) of the end-effector 110 according attitude control information of the welding robot 100 considering the moving distance of the moving tip.

The robot controller 150 may count the number of welding times of the welding gun 120 and may start the tip dressing operation using the polisher 130 when the counted number of welding times reaches a threshold value.

Figure 3A:
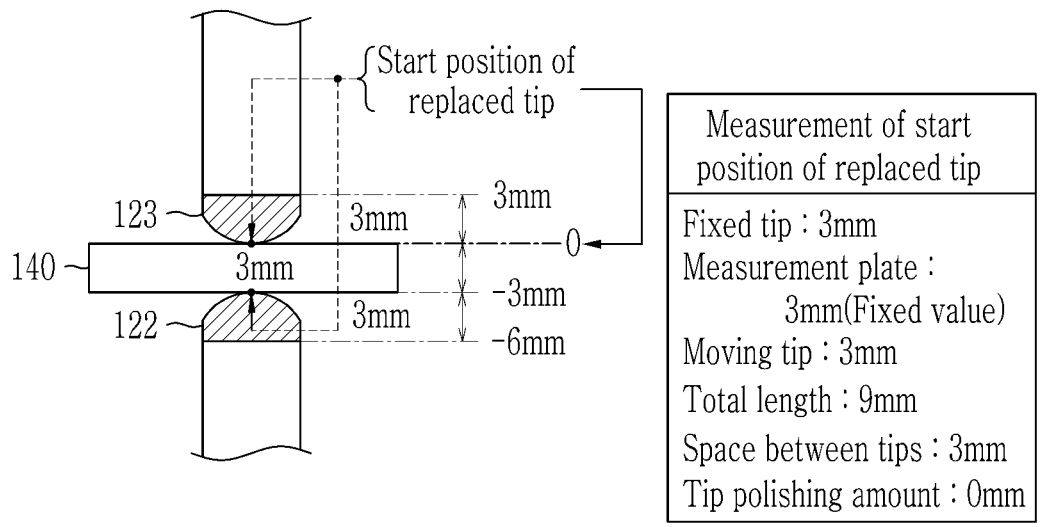
FIG. 3A and FIG. 3B are a conceptual diagram for explaining a method for measuring data regarding a tip of the welding gun in one form of the present disclosure.
Figure 3B:
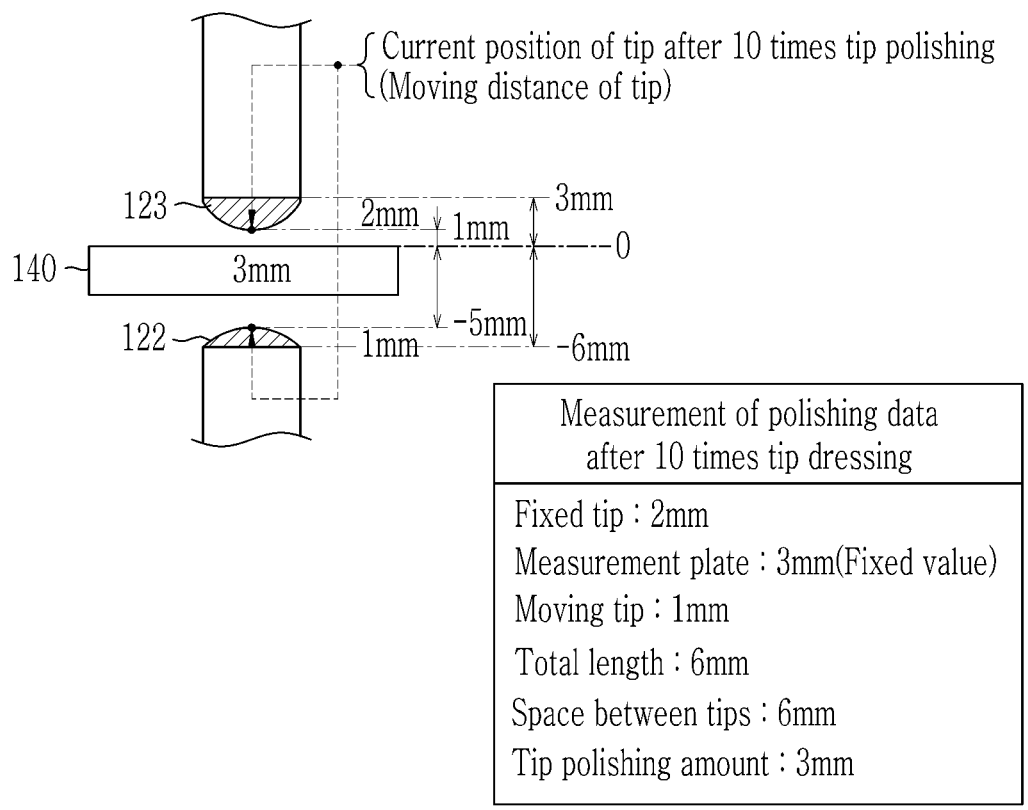

The robot controller 150 may store the number of polishing, space between the tips, and the tip polishing amount generated after the tip dressing operation of the welding gun 120 in a table or a memory. The space between the tips may mean a tip interval that increases as much as the tip polishing amount every polishing number in a state where space between the fixed tip 122 and the moving tip 123 when the tips are in contact with the measurement plate 140 between the tips at first after replacement of the tips is set to 0. As shown in FIGS. 3A and 3B, the space between the tips may be comparison data for calculating a tip interval corresponding to current number of polishing and an incremental amount of the tip interval. The incremental amount of the tip interval may be the tip polishing amount or the moving distance of the moving tip.

The robot controller 150 may match the tip polishing data of a normal state accumulated in the table for a predetermined time period with robot identification information (ID) to transmit the matched tip polishing data to the server 200.

The server 200 may be a monitoring system for managing a polishing state of the tips of the welding gun 120 of each of the welding robots 100.

The server 200 may provide customized reference data for determining the tip polishing state in consideration of change factors at a time when the tip polishing amount is measured. The change factors may include a mounting state (e.g., a mounting error occurring in a mounting length of the replaced tip) of the replaced tips of each of the welding robots 100 disposed in the production line and a state of the polisher.

That is, the server 200 may collect the tip polishing data from the robot controller 150 to accumulate the collected data with the robot identification information (ID) and may learn the accumulated data through an artificial neural network to generate the customized reference data for determining the tip polishing state corresponding to the robot ID. The reference data may be neural network setting parameter information that determines the tip polishing state according to the tip interval corresponding to the number of polishing and an incremental amount of the tip interval as normal, excessive (or great), or too little (or less). The tip interval and the incremental amount of the tip interval may be determined based on a start position of the replaced tips measured in a state where the tips 122 and 123 are in contact with the measurement plate 140 between the tips.

The robot controller 150 may set an artificial neural network of the robot based on the reference data received from the server 200 after the tip replacement so that the robot controller determines the tip polishing state according to the number of polishing and the tip polishing amount for each tip dressing operation in real time.

Configurations of the robot controller and the server in some forms of the present disclosure will be described with reference to FIG. 2.

Figure 2:
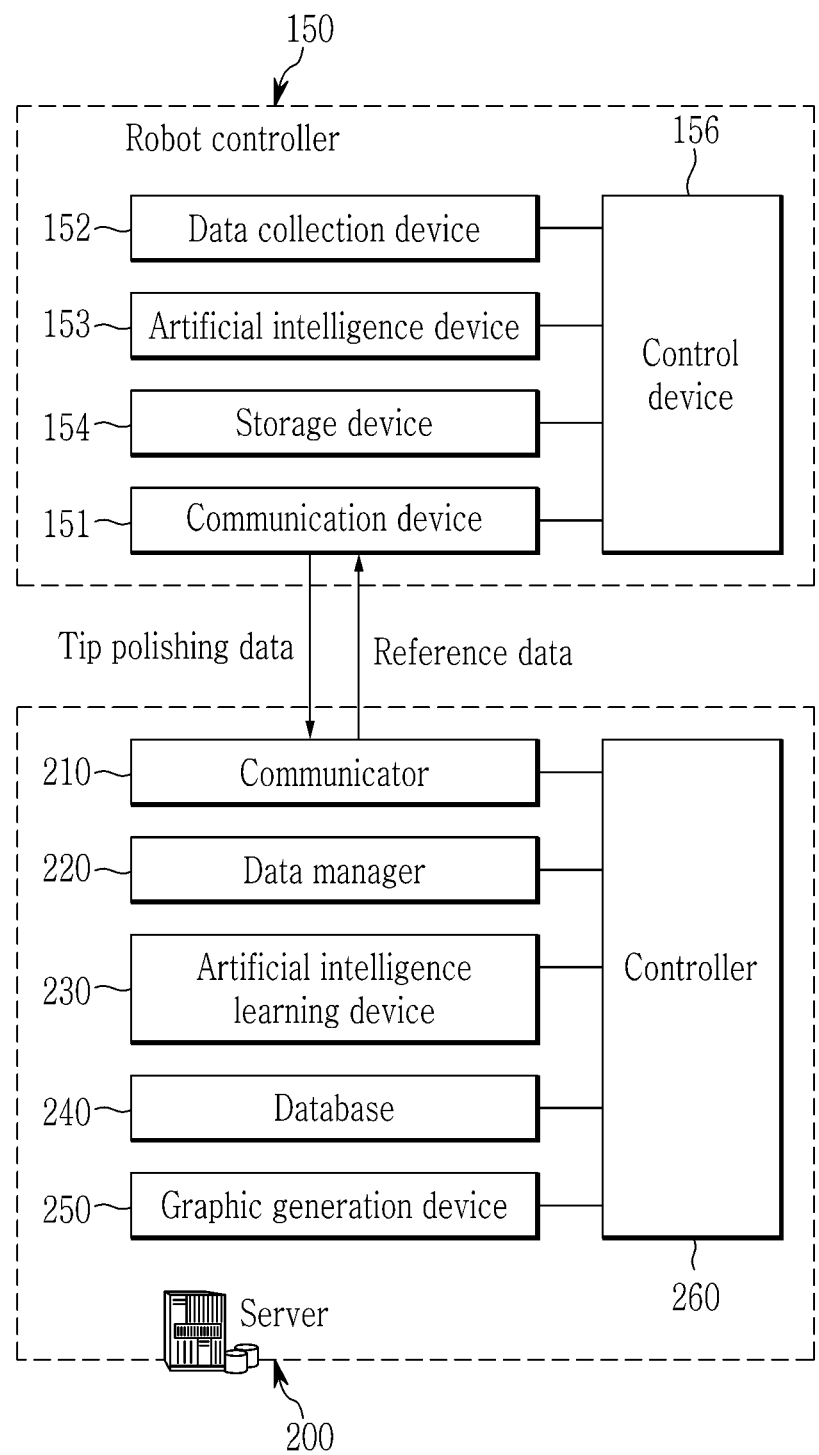
FIG. 2 is a block diagram schematically showing configurations of a robot controller and a server in one form of the present disclosure.

FIG. 2 is a block diagram schematically showing the configurations of the robot controller and the server in some forms of the present disclosure.

Referring to FIG. 2, the robot controller 150 may include a communication device 151, a data collection device (or a data collection module) 152, an artificial intelligence device 153, a storage device 154, and a control device 155.

The communication device 151 may be connected to the server 200 via a network in the production line or wired and wireless communication to transmit and receive data.

The communication device 151 may match the tip polishing data periodically collected with the robot identification information (ID) to transmit the matched tip polishing data to the server 200 and may receive the neural network-based reference data that artificial intelligence in the server 200 learns.

The data collection device 152 may measure the tip polishing amount that is a thickness of which the ends of the tips 122 and 123 is polished when the tips are in contact with the measurement plate 140 between the tips after the tip dressing operation by the polisher 130.

The polishing amount of the tips may vary depending on various variables such as how the welding robot 100 is installed, a type of the tip used, a wear state of the cutter blades during polishing, a pressure of the tip, and a polishing time. Therefore, a human being may not manage the polishing state of the tip mounted on the welding gun 120 as data. The data collection device 152 may collect the tip polishing data instead of a human being to manage the tip polishing state of each of the welding robots 100.

The data collection device 152 may collect the number of polishing and the tip polishing amount for each tip dressing operation to store the collected data in the table based on the start position of the replaced tips measured in the state where the tips 122 and 123 are in contact with the measurement plate 140 between the tips.

FIGS. 3A and 3B are a conceptual diagram for explaining a method for measuring data regarding the tip of the welding gun in some forms of the present disclosure A numerical value is exaggerated for convenience and understanding of description in FIGS. 3A and 3B and description regarding FIGS. 3A and 3B, but some forms of the present disclosure may be not limited to the numerical value.

FIG. 3A indicates the start position of the replaced tips measured when the moving tip 123 is moved to an upper surface of the measurement plate 140 by operation of the servo motor 124 in a state where the fixed tip 122 is fixed to a lower surface of the measurement plate after the tip is replaced with a new product. The measurement of the start position may be performed by the attitude control of the welding robot 100. The upper surface of the measurement plate 140 with which the moving tip 123 is in contact after the tip replacement may be defined as zero point.

As shown in FIG. 3A, assuming that a length of the fixed tip 122 or the moving tip 123 is 3 mm when a pressure between the tips at the start position becomes a predetermined pressure (e.g., 100 kgf) and a length of the measurement plate 140 is 3 mm, a total length of the fixed tip, the moving tip, and the measurement plate may become 9 mm. At this time, a space between an end of the moving tip 123 that is contact with the upper surface of the measurement plate 140 and an end of the fixed tip 122 that is contact with the lower surface of the measurement plate 140 may be 3 mm. When a thickness 3 mm of the measurement plate 140 that is a fixed value is subtracted from the space between the ends of the tips, the tip polishing amount (or polishing amount of the tip) at the start position may become 0 mm.

When the tip of the welding gun is replaced, the start position may be set to 0, but it is difficult for a worker or an operator to manage the start position because a reference is changed due to tip mounting error or tip size error for each welding robot 100.

The measurement of the start position in some forms of the present disclosure is meaningful in that the start position is set according to a value measured when the tip is replaced.

The end of the moving tip 123 and the end of the fixed tip 122 may be polished based on the start position when the number of the tip polishing according to the tip dressing operation is increased, and thus the tip space according to the tip polishing amount may be gradually increased.

FIG. 3B may represent a state where the moving tip 123 and the fixed tip 122 are positioned at the start position in order to measure the tip polishing data at a current position after 10 times of the tip dressing operations are performed. The current position may be determined according to the robot's attitude control which is the same as the attitude control for the start position. As shown in FIG. 3A, the measurement plate 140 may be in contact with the tips 122 and 123 at the start position. However, as shown in FIG. 3B, the space corresponding to the tip polishing amount may be formed between the tips 122 and 123 and the measurement plate 140 at the current position.

When the measurement plate 140 is pressed by a predetermined pressure (e.g., 100 kgf) at the current position, a total length of the fixed tip 122, the moving tip 123, and the measurement plate 140 may become 6 mm because a length of the fixed tip is 1 mm, a length of the moving tip is 2 mm, and a length of the measurement plate is 3 mm.

It can be seen that the tip space 6 mm due to the tip polishing amount 3 mm is increased when the current position of ends of the fixed tip 122 and the moving tip 123 shown in FIG. 3B is compared with the start position shown in FIG. 3A.

The tip polishing amount 3 mm generated after the 10 times of the tip dressing operations may be a moving distance of the moved tip 123 moved by the servo motor 124 based the start position when the measurement plate 140 is in contact with the tips 122 and 123. The moving distance of the moved tip 123 may have the same meaning as the tip polishing amount or an increase amount of the tip space.

The data collection device 152 may measure the tip polishing amount 3 mm as the moving distance that the moving tip 123 moves from the start position of the tips to the upper surface of the measurement plate 140 in a state where the fixed tip 122 is contact with the lower surface of the measurement plate. The data collection device 152 may calculate the tip space 6 mm at the current position by adding the tip polishing amount 3 mm to a space between the tips immediately before the current position.

As described above, the tip polishing amount 3 mm may be measured using the moving distance of the moving tip 123. In order to perform the tip replacement, it is necessary to determine how much the fixed tip 122 and the moving tip 123 are polished.

Thus, the data collection device 152 may measure a polishing amount 1 mm of the moving tip 123 using the moving distance that the moving tip 123 moves to the upper surface of the measurement plate 140 at the current position shown in FIG. 3B. The data collection device 152 may calculate a polishing amount 2 mm of the fixed tip 122 by subtracting the polishing amount 1 mm of the moving tip 123 from the tip polishing amount 3 mm.

The data collection device 152 may position the fixed tip 122 and the moving tip 123 at the same position as the current position every time the tip dressing operation is performed so that the data collection device measures the tip polishing data based on the moving distance of the moving tip 123.

Figures 4, 5:
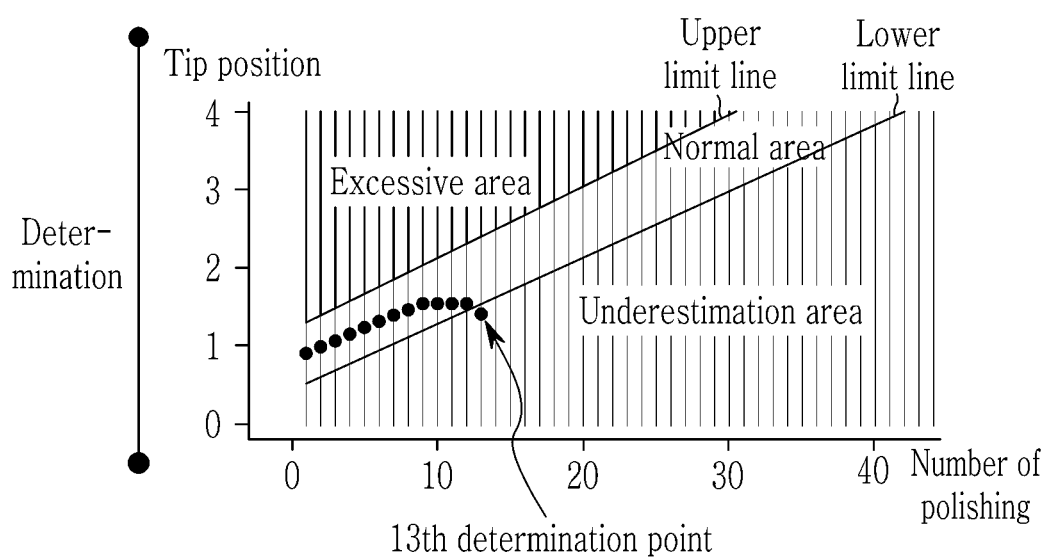
FIG. 4 shows a table in which polishing data of the tip of the welding gun in one form of the present disclosure is stored.
FIG. 5 shows a graph explaining determination of the tip polishing state in one form of the present disclosure.

FIG. 4 shows the table in which the tip polishing data in some forms of the present disclosure is stored.

Referring to FIG. 4, the tip polishing data collected by the data collection device 152 may include the start position that is positions of the tips replaced by the operator, the number of polishing of the replaced tip, the tip space due to polishing of the replaced tip measured at the current position, and the tip polishing amount or an incremental amount of the tip space due to polishing of the replaced tip. The start position may be positions of the replaced tips 122 and 123 generated when the measurement plate 140 is in contact with the tips for the first time, may be a space between the tips excluding a thickness of the measurement plate 140, and may be set to 0. The current position may be positions of the currently polished tips 122 and 123 and may have the tip space increased as much as the tip polishing amount in a state where the welding robot 100 is set to the same attitude control as attitude control for the start position.

Since collection of the tip polishing data is performed in real time, the data collection device 152 may directly collect the tip polishing data to store in the table and may transmit to the server 200 in a predetermined period. For example, the data collection device 152 may transmit the tip polishing data stored in the table at every tip replacement period.

The artificial intelligence device 153 may perform a calculation using an artificial intelligence neural network structure similar to that of the server 200.

The artificial intelligence device 153 may set or insert the reference data learned in the server 200 in an artificial neural network of the robot and may determine whether the tip polishing state according to the tip polishing data collected after the tip polishing is normal based on the set artificial neural network of the robot.

In other words, the artificial intelligence device 153 may calculate the tip polishing data collected from the data collection device 152 using the neural network to which the reference data is applied to determine whether the tip polishing amount is normal, too little, or excessive.

FIG. 5 shows a graph for explaining determination of the tip polishing state in some forms of the present disclosure.

FIG. 5 shows a graph for determining the tip polishing state based on the reference data learned in the server 200 applied to the neural network and a determination result thereof.

The graph may display a determination point generated when the result of determination of the tip polishing state performed by the artificial intelligence device 153 is normal in a normal area with a predetermined range.

The graph may display a determination point (e.g., a 13$^{th}$ determination point) generated when the tip polishing amount is too little in an underestimation area below a lower limit line of the normal area or a determination point generated when the tip polishing amount is excessive in an overestimation area or an excessive area beyond a upper limit line of the normal area.

The graph may be shared with the server 200 in real time so that the operator grasps at a glance whether the tip polishing amount corresponding to the number of polishing of the tip is normal, too little, or excessive.

The storage device 154 may store various programs and data necessary for the robot controller 150 to control the welding robot 100.

The storage device 154 may cumulatively store the tip polishing data collected from the data collection device 152 in the table and may store the reference data applied to the neural network that is received from the server 200.

The control device 155 may control an overall operation of the welding robot 100 and may include at least one processor to control the overall operation.

When it is determined that the tip polishing amount is excessive, the control device 155 may adjust the excessive tip polishing amount within a normal range by reducing a pressure and a time of the tip polishing performed by the welding robot 100.

As a result, some forms of the present disclosure may resolve a reduction in a service life of the tip due to excessive tip polishing during the tip dressing operation and a problem of an increase in cost of consumable caused by frequent replacement of the tip due to excessive tip polishing during the tip dressing operation.

When it is determined that the tip polishing amount is too little, the control device 155 may adjust the deficient tip polishing amount to a normal range through the re-polishing.

Thus, welding quality may be prevented from being deteriorated due to a poor tip polishing state.

A large amount of the tip polishing is disadvantageous to cost reduction but does not affect product production and quality. However, when the tip polishing amount is small, it is necessary to constantly find and fix a defective welded product. A small amount of the tip polishing seriously affects product production and quality.

Therefore, when underestimation of the tip polishing amount is repeated over a predetermined number of times, the control device 155 may generate an emergency event to stop the production line and generate an alarm and may transmit the emergency event to the server 200 to alert the operator of the emergency event. Further, the control device 155 may alert the operator to check or replace the cutter blade of the polisher 130 so that a problem caused by the small tip polishing amount is solved.

The control device 155 may not control a separate correction operation of the welding robot 100 if the tip polishing amount according to the number of polishing of the tip is within a normal range.

The control device 155 may calculate a remaining length of the fixed tip 122 and the moving tip 123 for each tip dressing operation to alert the operator or the server 200 of replacement time of the tip when the tip valid length is exhausted.

Thus, some forms of the present disclosure may reduce an increase in cost of consumable due to replacement of the tip that has a long service.

The server 200 may include a communicator 210, a data manager 220, an artificial intelligence learning device 230, a database 240, a graphic generation device 250, and a controller 260.

The communicator 210 may be connected to the communication device 151 of the robot controller 150 through a network in the production line or wired/wireless communication to transmit and receive data with the communication device.

The communicator 210 may receive the tip polishing data periodically collected by the robot controller 150 and may transmit the reference data that artificial intelligence of the server 200 learns and is based on the neural network of the server to each of the welding robots 100.

The data manager 220 may classify the tip polishing data collected by the robot controller 150 based on the robot identification information (ID) for learning artificial intelligence of the server 200 and may manage the classified data.

Normal data (e.g., OK data) and bad data (e.g., no good (NG) data) regarding the tip polishing state may be required in order to learn artificial intelligence of the server, but the robot controller 150 may collect only the normal data regarding the tip polishing data. Therefore, the bad data according to setting information of the operator should be set.

Figure 6:
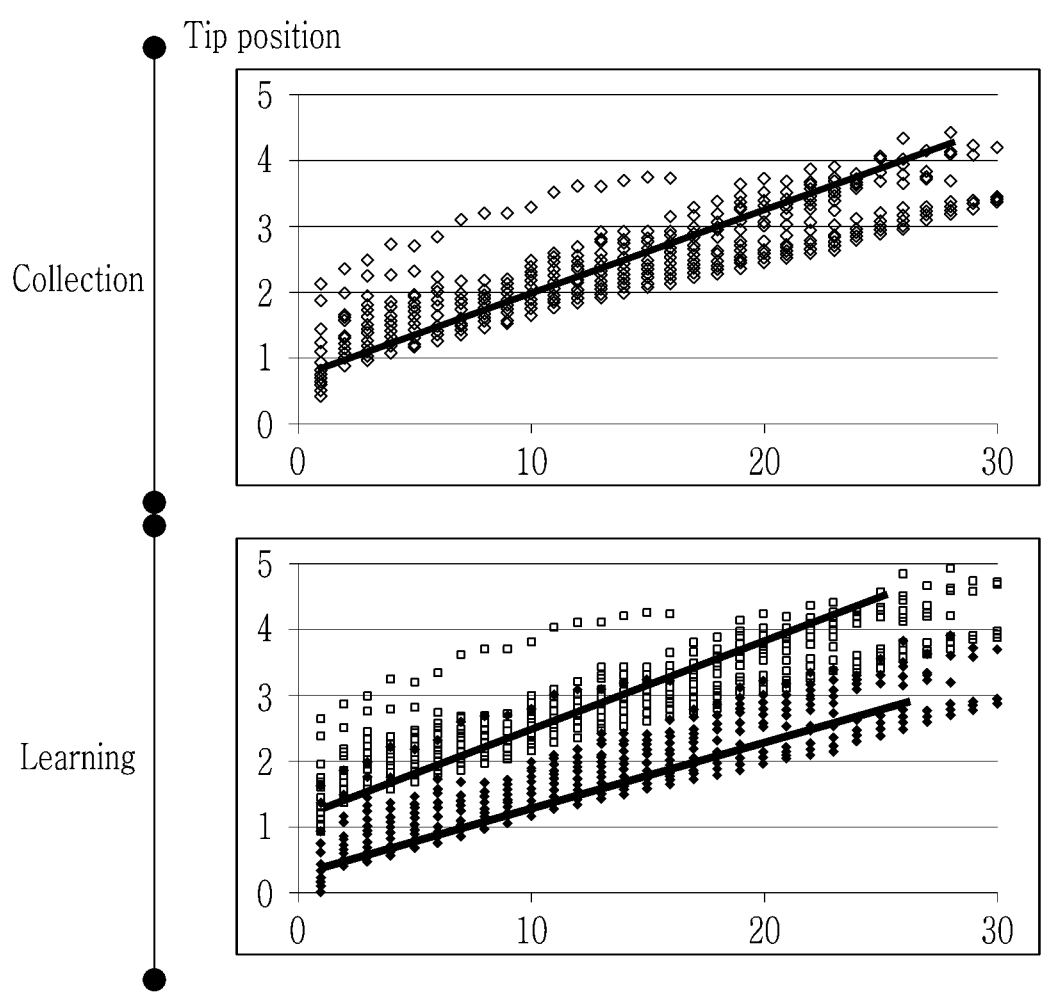
FIG. 6 shows a graph explaining an example of collection and learning of the tip polishing data in one form of the present disclosure.

FIG. 6 shows a graph explaining an example of collection and learning of the tip polishing data in some forms of the present disclosure.

FIG. 7 shows an example of classification data for determining whether the tip polishing data is normal or bad in some forms of the present disclosure.

Referring to FIGS. 6 and 7, the normal data (or OK data) and the bad data (or NG data) may be required to learn an artificial intelligence of the server, whereas the robot controller 150 may receive only the normal tip polishing data. Thus, the data manager 220 may generate the classification data including the bad data for learning of the artificial intelligence.

Since a large amount of the bad data is not output when the production line is operated, the data manager 220 may generate the bad data as many as the number of the normal data using the bad data previously accumulated or a predetermined criterion. This may allow the operator to vary the criterion for setting the normal data and the bad data.

In order to determine the tip polishing state of each of the welding robots 100, the artificial intelligence learning device 230 may calculate the classification data generated by the data manager 220 through the learning of the artificial intelligence to generate the reference data that transplant or transmit the learned neural network.

Figure 8:
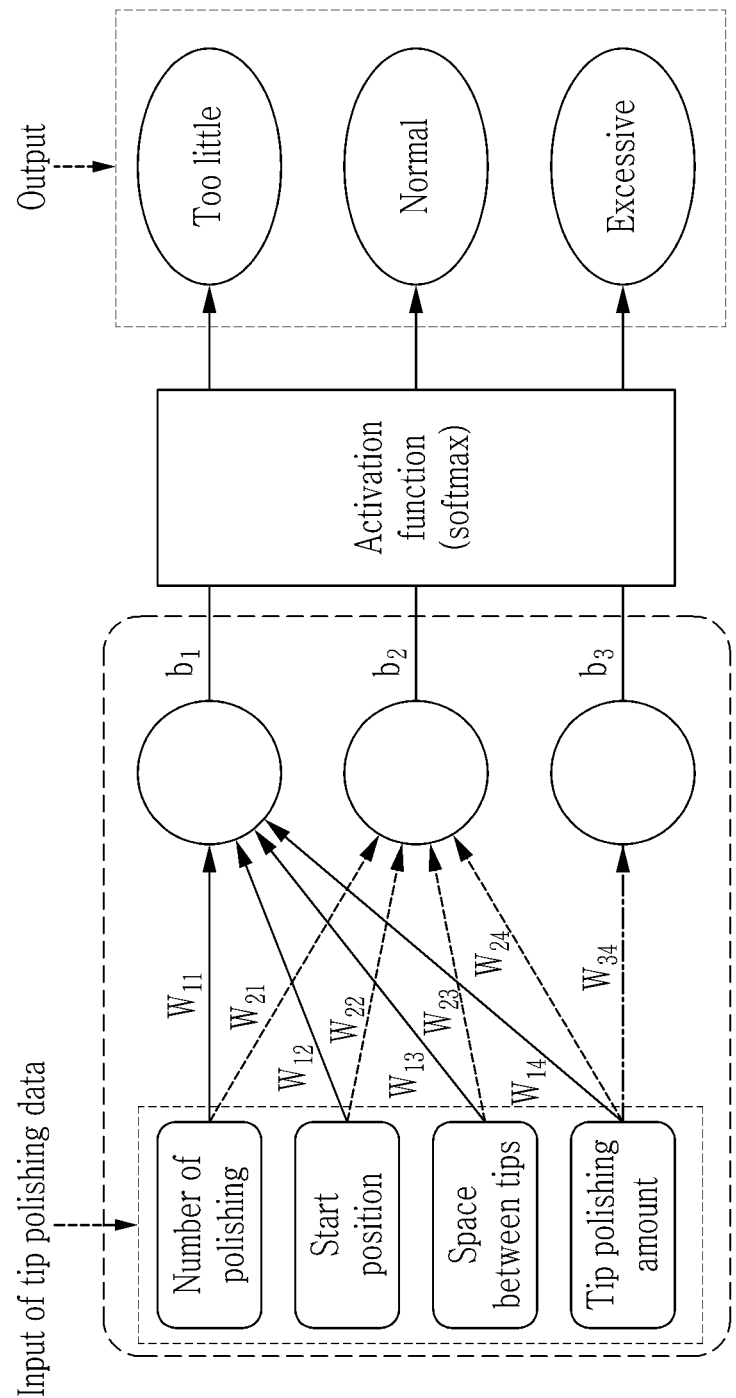
FIG. 8 shows a neural network structure for learning an artificial intelligence of the server in one form of the present disclosure.

FIG. 8 shows a neural network structure for the artificial intelligence learning in some forms of the present disclosure.

Referring to FIG. 8, the artificial intelligence learning device 230 may learn the number of the tip polishing, the start position, the tip space, the tip polishing amount, and the bad data using the artificial neural network, and may output the reference data for determining whether the tip polishing state is normal.

Since the neural network structure should be simple in order to transplant the neural network structure to the robot controller 150, the artificial intelligence learning device 230 may set the reference data as two layers using open-source software used for machine learning or deep learning programming framework (e.g., Tensorflow).

FIGS. 9A and 9B show an example of the reference data output through the artificial neural network learning in some forms of the present disclosure.

Referring to FIGS. 9A and 9B, each layer of the reference data calculated by the artificial intelligence learning device 230 may have a total of 15 parameters including a weight (e.g., a weight value) and a bias. The weight or the bias of the reference data that initializes and trains the artificial neural network of each of the welding robot 100 may be adjusted.

The database 240 may store various programs and data for managing the tip polishing state of the welding gun 120 corresponding to the robot identification information (ID) of each of the welding robots 100 using the server 200 and may store data generated according to operation of the server.

The database 240 may store and manage the tip polishing data, the classification data, and the reference data corresponding to the robot identification information (ID) of each of the welding robots 100.

The graphic generation device 250 may display a result of determination of the tip polishing state of each of the welding robots 100 based on data received from the robot controller 150 or stored in the database 240 through a graph so that the operator checks or confirms the result.

Thus, the operator may determine at a glance whether the tip polishing amount corresponding to the number of polishing of the tip is in the normal range, too little, or excessive.

Figure 10A:
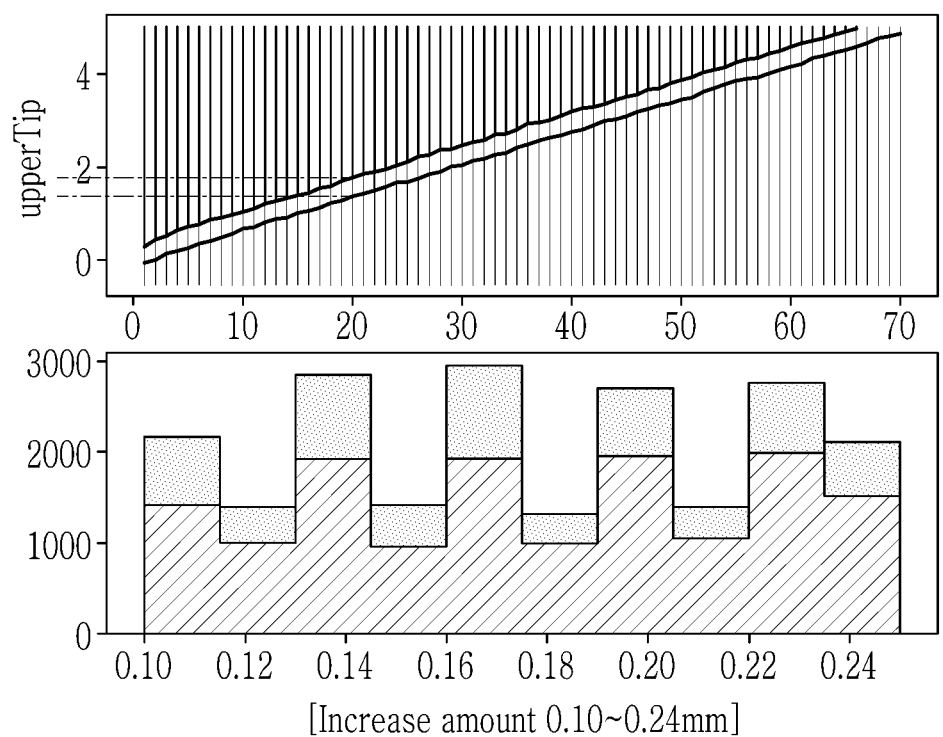
FIGS. 10A and FIG. 10B show graphs for determining the tip polishing state based on an increase amount of the tip space in one form of the present disclosure.
Figure 10B:
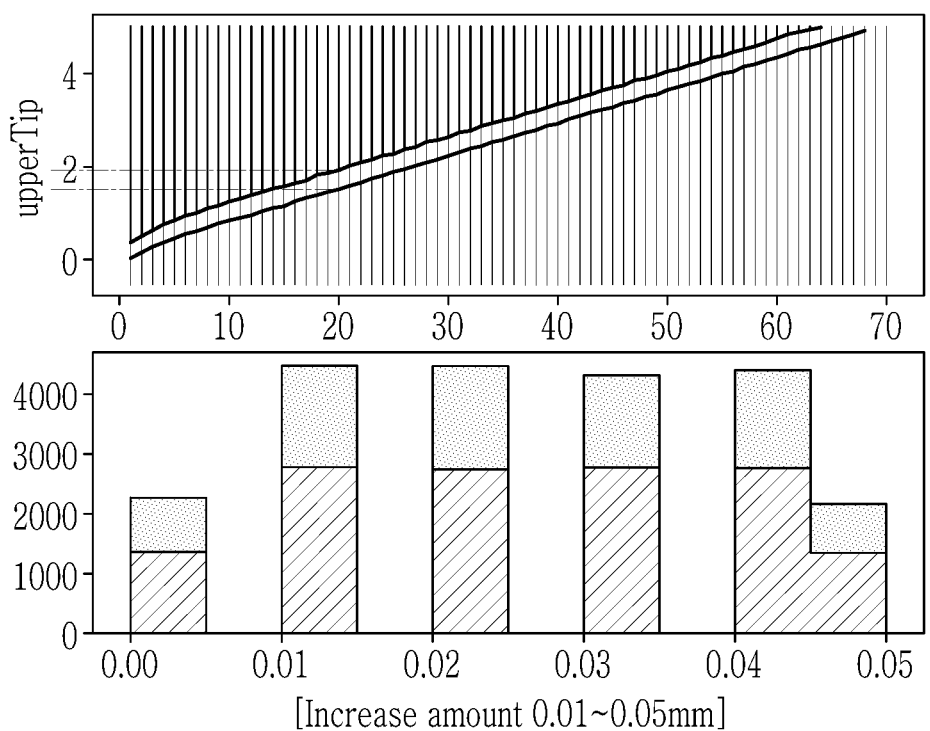

FIGS. 10A and 10B show graphs for determining the tip polishing state based on an increase amount of the tip space in some forms of the present disclosure.

Referring to FIGS. 10A and 10B, when the number of polishing of the tip is 1 to 70 times and the reference data having the two layers is used, a width of the normal range of the tip polishing amount may be maintained at the same thickness.

When a first graph of the graphs having a large increase amount (i.e., 0.1-0.24 mm) of the tip space is compared with a second graph of the graphs having a small increase amount (i.e., 0.01-0.05 mm) of the tip space and having the number of polishing equal to the number of polishing of the first graph, the width of the normal range is similar, but a too little area or the underestimation area of the second graph rises and widens. It is possible to intuitively judge in a short period of time that the tip is not polished properly due to the increase amount even if the same number of polishing is set.

The controller 260 may be a central processing unit that controls an overall operation of the communicator 210, the data manager 220, the artificial intelligence learning device 230, the database 240, and the graphic generation device 250 in order to manage the tip polishing state of the welding gun. The controller 260 may control functions of the communicator 210, the data manager 220, the artificial intelligence learning device 230, the database 240, and the graphic generation device 250 using programs and data for executing functions of the communicator 210, the data manager 220, the artificial intelligence learning device 230, the database 240, and the graphic generation device 250.

The controller 260 may transmit the weight and the bias of the reference data calculated in the artificial intelligence learning device 230 to each of the robot controllers 150 corresponding to the robot identification information (ID) and may update a state of the neural network of the welding robot 100.

The controller 260 may receive the neural network and a parameter set in the welding robot 100 from the welding robot to display the tip polishing state graph according to input of an arbitrary value through the graphic generation device 250. This allows the operator to generate bad data based on the normal tip polishing data.

The method for managing the welding gun in some forms of the present disclosure will be described based on configuration of the welding gun management system described above.

Figure 11:
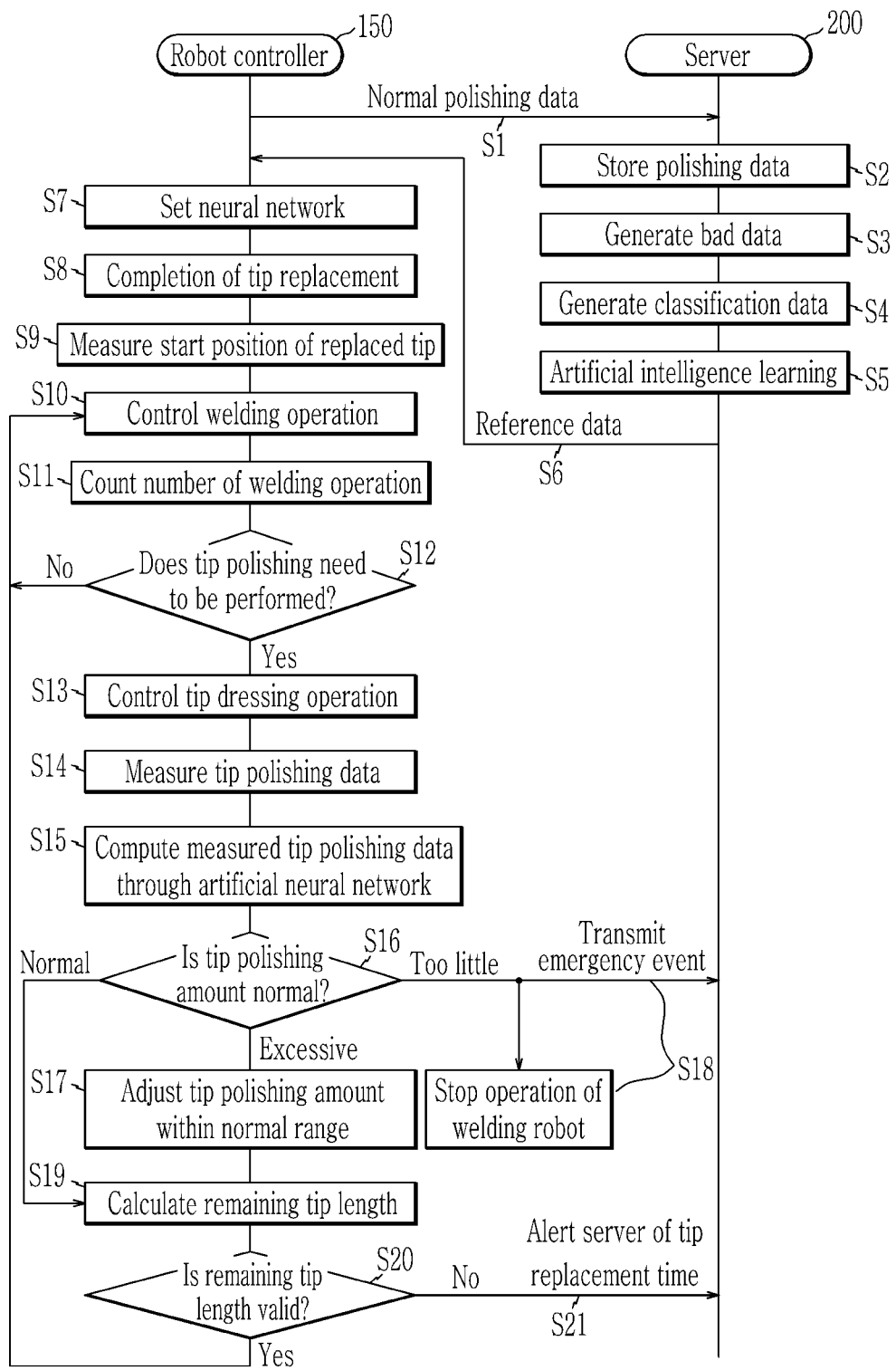
FIG. 11 is a flowchart outlining a welding gun management method for determining the tip polishing state in one form of the present disclosure.

FIG. 11 is a flowchart outlining the welding gun management method for determining the tip polishing state in some forms of the present disclosure.

Referring to FIG. 11, when the normal tip polishing data accumulated in the robot controller 150 for a predetermined time period is received from the robot controller (step S1), the server 200 may the normal tip polishing data in a storage position of the database 240 according to the robot identification information (ID) (step S2). The normal tip polishing data may be data indicating that the tip polishing state is determined to be normal and may be accumulated at every time the tip polishing is performed to be received at a constant period. The normal tip polishing data may be received at the tip replacement time.

Since the server 200 receives only the normal tip polishing data from the robot controller 150, the server may generate arbitrary bad data for learning of an artificial intelligence of the server (step S3). At this time, the bad data may be generated as many as the number of the normal data.

The server 200 may generate classification data by classifying the tip polishing amount of the normal tip polishing data and the bad data as normal, excessive, and too little (step S4).

The server 200 may compute or learn the classification data through the artificial intelligence neural network to generate the reference data that transplant the learned classification data or the learned neural network to the robot controller 150 in order to determine the tip polishing state of each of the robot controllers 150 (step S5). At this time, the server 200 may learn the number of the tip polishing, the start position, the tip space, the tip polishing amount, and the bad data using the artificial neural network, and may obtain the reference data for determining whether the tip polishing state is normal.

The server 200 may transmit the reference data to the robot controller 150 corresponding to the robot identification information (ID) (step S6).

The robot controller 150 may transmit the normal tip polishing data accumulated for the predetermined time period to the server 200 when the tip of the welding gun 120 is replaced (the step S1).

After transmitting the tip polishing data to the server 200 during the tip replacement operation, the robot controller 150 may set the neural network based on the reference data (step S7) when the reference data is received from the server 200 (step S6). At this time, the robot controller 150 may load or adjust parameter values set in the weight and the bias of the reference data to apply the loaded values to the neural network of the robot controller. The step for setting the neural network may be performed not only when the tip is replaced but also when the reference data is received at any step during the welding operation.

When replacement of the tip of the welding gun 120 is completed (step S8), the robot controller 150 may measure the start position when the tips 122 and 123 are in contact with the measurement plate 140 between the tips through attitude control of welding robot 100 to store the measured value in the table (step S9).

The robot controller 150 may change a position of the welding gun 120 through the attitude control of the welding robot 100 to control a welding operation (step S10).

The robot controller 150 may count the number of the welding operation (step S11) and may continue counting the number of the welding operation when the number of the welding operation is less than a predetermined threshold value for the tip dressing operation (No in step S12).

When the number of the welding operation is greater than or equal to the predetermined threshold value for the tip dressing operation (Yes in the step S12), the robot controller 150 may stop the welding operation and may place or position the tip of the welding gun 120 on the polisher 130 to control the tip dressing operation (step S13). At this time, the robot controller 150 may alternately position the fixed tip 122 and the moving tip 123 at the polisher 130 in which a plurality of cutter blades are rotated and may press the tips during a predetermined polishing time.

The robot controller 150 may measure the tip polishing amount in a state where the tips 122 and 123 are in contact with the measurement plate 140 between the tips and may store the tip polishing data corresponding to the number of the tip polishing in the table (step S14). The tip polishing data may include the start position, the number of polishing of the tip, the tip space, and the tip polishing amount.

The robot controller 150 may compute the measured polishing data through the set neural network to determine whether the tip polishing amount is normal (steps S15 and S16).

At this time, the robot controller 150 may determine whether the tip polishing amount is normal or bad, may determine whether the tip polishing amount is excessive or too little, and may perform management control corresponding to each determination result.

For example, when it is determined that the tip polishing amount exists in the normal range or the normal area in the step S16, the robot controller 150 may record the determination result in the table.

The robot controller 150 may calculate current positions of an end of the fixed tip 122 and an end of the moving tip 123, and may calculate the remaining tip length of the tips in comparison with a new product (step S19).

The robot controller 150 may return to the step S10 to resume the welding operation when the remaining tip length is valid or greater than or equal to a valid reference value (Yes in step S20).

The robot controller 150 may alert the server 200 of the tip replacement time (step S21) when the remaining tip length is not valid or less than the valid reference value (No in the step S20).

When the robot controller 150 determines in the step S16 that the tip polishing amount exists in the excessive area beyond the normal range, the robot controller 150 may adjust the excessive tip polishing amount within the normal range by reducing a pressure and a time of the tip polishing performed by the welding robot 100 (step S17).

Thereafter, the steps S19 and S21 of the robot controller 150 are controlled in the same manner as described above.

The robot controller 150 may stop an operation of the welding robot 100 and may immediately alert the server 200 of the emergency event (step S18) when the robot controller 150 determines in the step S16 that the tip polishing amount is present in the too little area out of the normal range.

An excessive amount of the tip polishing is disadvantageous to cost reduction but does not affect product production and quality. However, a too little amount of the tip polishing causes welding failure to adversely affect product production and quality.

The robot controller 150 may adjust the deficient tip polishing amount to the normal range through the re-polishing only when the tip polishing amount is once underestimated. When underestimation of the tip polishing amount is repeated over a predetermined number of times (e.g., 1 times), the robot controller 150 may generate the emergency event to stop the production line and generate an alarm and may transmit the emergency event to the server 200 to alert the operator of the emergency event. At this time, the robot controller 150 may alert the operator to check or replace the cutter blade of the polisher 130 so that a problem caused by the too little tip polishing amount is solved.

Some forms of the present disclosure may collect the tip polishing data from the robot controller of the welding robot installed in the production line of the vehicle using the server to learn the tip polishing data through the artificial intelligence and may transplant or transfer the reference data for determining whether the polishing amount of the tip of the welding robot is good or bad into the neural network of the robot controller so that it determines the normal state, the excessive state, and the too little state of the polishing amount of the tip. Thus, some forms of the present disclosure may manage the tip polishing state of the welding gun mounted on each of the welding robots in real time without a sensor based on the learning data.

Some forms of the present disclosure may reduce the pressure (e.g., a welding force) and the polishing time of the welding robot and may alert the server of the replacement time of the tip according to the determination of the validity of the tip length measured in each robot controller when the polishing amount of the tip is overestimated. Accordingly, some forms of the present disclosure may solve a problem with the production line stop caused by frequent tip replacement and a problem of consumable cost increase.

In addition, some forms of the present disclosure may adjust the polishing amount of the tip which is insufficient within the normal range through the re-polishing or may generate the event stopping the welding robot when the polishing amount of the tip is underestimated. Therefore, some forms of the present disclosure may inhibit the welding quality from being deteriorated due to the tip polishing failure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

- 100: welding robot 110: end-effector
- 120: welding gun 121: gun arm
- 122: fixed tip 123: moving tip
- 124: servo motor 130: polisher
- 140: measurement plate 150: robot controller
- 151: communication device 152: data collection device
- 153: artificial intelligence device 154: storage device
- 155: control device 200: server
- 210: communicator 220: data manager
- 230: artificial intelligence learning device 240: database
- 250: graphic generation device 260: controller

What is claimed is:

1. A system for managing a polishing state of tips of a welding gun of each welding robot installed in a production line of a vehicle, comprising:
   a robot controller configured to store tip polishing data including a number of polishing the tips and a polishing amount of the tips that are generated after each tip dressing of the welding gun in a table; and
   a server configured to:
      collect the tip polishing data from the robot controller;
      store the collected tip polishing data based on robot identification information of the welding robot; and
      learn the stored tip polishing data through an artificial neural network of the server that is an algorithm and is included in the server to generate reference data that determines the polishing state of the tips corresponding to the robot identification information,
   wherein the robot controller is further configured to:
      set an artificial neural network of the robot based on the reference data; and
      determine whether the polishing state of the tips based on the number of polishing the tips and the polishing amount of the tips is normal.

2. The system of claim 1, wherein:
   the reference data includes an artificial neural network setting parameter information that determines the polishing state of the tips based on a space between the tips corresponding to the number of polishing and an increase amount of the space between the tips as normal, excessive, or insufficient, and
   the space between the tips and the increase amount of the space is determined based on a start position of replaced tips of the welding gun measured in a state where the tips are in contact with a measurement plate between the tips.

3. The system of claim 1, wherein the welding gun comprises:
   a gun arm installed on one surface of a bracket that is mounted on an end-effector of the welding robot;
   a fixed tip that is an electrode that is in contact with one side of a base material and that is fixedly mounted on a holder of the gun arm;
   a moving tip that is an electrode that is in contact with another side of the base material and that is mounted on an adaptor formed on another side of the gun arm such that the moving tip is capable of moving in a forward direction and a backward direction; and
   a servo motor that is operated based on an applied control signal and configured to:
      move the moving tip in the forward direction or the backward direction and;
      measure a moving distance of the moving tip based on an amount of rotation of the servo motor.

4. The system of claim 1, wherein the robot controller further comprises:
   a communication device configured to:
      match the tip polishing data with the robot identification information;
      transmit, to the server, the matched tip polishing data; and
      receive, from the server, the reference data;
   a data collection device configured to collect the tip polishing data of the tips measured in the state where the tips are in contact with a measurement plate between the tips;
   an artificial intelligence device configured to:
      calculate the collected tip polishing data using the artificial neural network to which the reference data is applied; and
      determine whether the polishing amount of the tips is normal, insufficient, or excessive;
   a storage device configured to cumulatively store the collected tip polishing data in the table; and
   a control device configured to reduce a pressure and a time of polishing the tips performed by the welding robot when it is determined that the polishing amount of the tips is excessive.

5. The system of claim 4, wherein the data collection device is configured to:
   collect a start position of replaced tips of the welding gun when a moving tip of the tips is moved to an upper surface of the measurement plate by a servo motor in a state where a fixed tip of the tips is fixed to a lower surface of the measurement plate after the tips are replaced; and store the collected position in the table.

6. The system of claim 5, wherein the tip polishing data includes at least one of the start position of both ends of the tips, the number of polishing of the replaced tips, a space between the tips due to polishing of the replaced tips measured at a current position of the tips, or an increase amount of the space between the tips.

7. The system of claim 6, wherein the current position is a position of a currently polished tips of the welding gun and has the space between the tips increased as much as the polishing amount of the tips in a state where the welding robot is set to the same attitude control as attitude control for the start position.

8. The system of claim 5, wherein:
a polishing amount of the moving tip is a moving distance that the moving tip moves to the upper surface of the measurement plate, and
a polishing amount of the fixed tip is a value obtained by subtracting the polishing amount of the moving tip from the polishing amount of the tips.

9. The system of claim 4, wherein the control device is configured to:
generate an emergency event to stop the welding robot; and
transmit the emergency event to the server to alert an operator of the system of the emergency event when underestimation of the polishing amount of the tips is repeated over a predetermined number of times.

10. The system of claim 4, wherein the control device is configured to:
calculate a remaining length of a fixed tip of the tips and the moving tip of the tips based on each tip dressing; and
alert the server of replacement time of the tips when the remaining length is less than a valid reference value.

11. The system of claim 1, wherein the server comprises:
a communicator configured to:
receive the tip polishing data periodically collected by the robot controller; and
transmit the reference data to the robot controller;
a data manager configured to generate classification data for artificial intelligence based the collected tip polishing data;
an artificial intelligence learning device configured to:
calculate the classification data through the the artificial intelligence; and
generate the reference data to determine the polishing state of the tips of each welding robot;
a database configured to store the tip polishing data, the classification data, and the reference data corresponding to the robot identification information;
a graphic generation device configured to display the polishing state of the tips of each welding robot based on data stored in the database through a graph so that an operator of the system checks the polishing state of the tips of each welding robot; and
a controller configured to:
transmit a weight and a bias of the reference data to each robot controller corresponding to the robot identification information; and
update a state of the artificial neural network.

12. The system of claim 11, wherein the data manager is configured to:

generate abnormal data equivalent to the number of normal data corresponding to the tip polishing data by using accumulated abnormal data or setting information of the operator.

13. The system of claim 11, wherein the artificial intelligence learning device is configured to:
set the reference data as two layers using open-source software used for machine learning; and
adjust parameter values set in the weight and the bias of each of the layers.

14. A method for managing a polishing state of tips of a welding gun of each welding robot installed in a production line of a vehicle, comprising:
a) setting, by a robot controller, an artificial neural network that determines the polishing state of the tips of the welding gun based on reference data received from the server and is an algorithm;
b) setting, by the robot controller, a space between replaced tips of the welding gun measured in a state where the replaced tips are in contact with a measurement plate between the tips as a start position;
c) measuring, by the robot controller, tip polishing data including a number of polishing the tips and a polishing amount of the tips that are generated after each tip dressing of the welding gun in a state where the tips are in contact with the measurement plate, wherein the polishing amount of the tips is determined based on the start position; and
d) computing, by the robot controller, the measured tip polishing data through the set artificial neural network to determine whether the polishing state of the tips is normal.

15. The method of claim 14, wherein the method further comprises:
matching, by the robot controller, the polishing data regarding the tips accumulated in a table for a predetermined amount of time with robot identification information of the welding robot to transmit the matched tip polishing data to the server; and
receiving, by the robot controller, the reference data derived by learning the polishing data regarding the tips though an artificial intelligence of the server.

16. The method of claim 14, wherein the step c) comprises:
measuring, by the robot controller, the tip polishing data based on a moving distance of a moving tip of the tips.

17. The method of claim 14, wherein the step d) comprises:
determining, by the robot controller, whether the polishing amount of the tips is normal, excessive, or insufficient.

18. The method of claim 17, wherein the step d) comprises:
adjusting, by the robot controller, the excessive polishing amount to a normal range by reducing a pressure and a time of polishing of the tips when the polishing amount of the tips is determined to be excessive.

19. The method of claim 17, wherein the step d) comprises:
adjusting, by the robot controller, a deficient polishing amount of the tips to a normal range through a re-polishing when the polishing amount of the tips is determined to be insufficient; and
generating, by the robot controller, an emergency event to stop the production line and to transmit the emergency event to the server to alert an operator of the emergency event when the polishing amount of the tips is determined to be insufficient over a predetermined number of times.

20. The method of claim 17, wherein the step d) comprises:
   when the polishing amount of the tips is within a normal range, recording, by the robot controller, the polishing amount of the tips in a table;
   calculating, by the robot controller, current positions of both ends of the tips to calculate a remaining tip length of the tips as compared to a new product; and
   alerting, by the robot controller, the server of replacement time of the tips when the remaining tip length is less than a valid reference value.

* * * * *